United States Patent [19]
Yoshino et al.

[11] Patent Number: 5,207,845
[45] Date of Patent: May 4, 1993

[54] PROCESS FOR MANUFACTURING ROLLED ARTICLES OF TITANIUM MATERIAL

[75] Inventors: Akira Yoshino; Haruo Senbokuya; Masaaki Tahara, all of Osaka, Japan

[73] Assignee: Daidousanso Co., Ltd., Osaka, Japan

[21] Appl. No.: 852,218

[22] PCT Filed: Nov. 20, 1991

[86] PCT No.: PCT/JP91/01598
  § 371 Date: May 28, 1992
  § 102(e) Date: May 28, 1992

[87] PCT Pub. No.: WO92/08556
  PCT Pub. Date: May 29, 1992

[30] Foreign Application Priority Data
  Nov. 20, 1990 [JP] Japan ........................ 2-316562

[51] Int. Cl.$^5$ ........................................ C22C 14/00
[52] U.S. Cl. ............................ 148/670; 148/669; 420/421
[58] Field of Search .............. 148/669, 670; 420/421

[56] References Cited

U.S. PATENT DOCUMENTS

| | | | |
|---|---|---|---|
| 4,098,623 | 7/1978 | Ibaraki et al. | 148/669 |
| 4,528,043 | 7/1985 | Mills | 148/669 |
| 4,634,478 | 1/1987 | Shimogori et al. | 420/421 |
| 4,874,480 | 10/1989 | Sonoda et al. | 205/322 |

FOREIGN PATENT DOCUMENTS 62-33005 2/1987 Japan .

Primary Examiner—Upendra Roy
Attorney, Agent, or Firm—Armstrong, Westerman, Hattori, McLeland & Naughton

[57] ABSTRACT

A process for manufacturing rolled articles of titanium material comprising steps of contacting heated titanium material with fluorine- or fluoride-containing gas to form a fluoride layer on the surface of the titanium material, removing the fluoride layer formed thereon just before rolling and then rolling the titanium material to give a rolled article. With this structure, passive coat layers, such as the oxide layer on the surface of the titanium material is changed to a fluoride layer. The fluoride layer protects the surface of the titanium material. Therefore even if there is space of time between formation and removal of the fluoride layer, the fluoride layer formed on the surface of the titanium material protects the same surface in a favorable condition, which results in preventing re-formation of an oxide layer on the titanium material surface.

1 Claim, 1 Drawing Sheet

PROCESS FOR MANUFACTURING ROLLED ARTICLES OF TITANIUM MATERIAL

FIELD OF THE INVENTION

The invention relates to a process for manufacturing rolled articles of titanium material.

BACKGROUND OF THE INVENTION

Titanium reacts with oxygen in the air when the titanium becomes at high temperature (about more than 600° C.) to form an oxide layer or film having several tens of $\mu$ in depth on and in the surface layer of titanium. Therefore, in case of hot rolling of titanium, the oxide film is formed on the surface of red heated titanium. However, since the titanium oxide is inferior in ductility, it causes a problem that the titanium is easily cracked. Conventionally, rolling speed and rolling temperature must be suitably adjusted or fitted to each kind and quality or property of the material to prevent its cracking.

However, it is very hard to adjust the rolling speed and rolling temperature fitting each kind and quality of the material and it is substantially impossible to exclude the crack and the like.

Accordingly, an object of the present invention is to provide a process for manufacturing rolled articles of titanium material wherein an oxide layer on the surface of titanium material is removed to be able to exclude crack and the like caused in rolling.

SUMMARY OF THE INVENTION

To accomplish the above object, the process for manufacturing rolled articles of titanium material comprises steps of contacting titanium material in a heated condition with fluorine- or fluoride-containing gas to form a fluoride layer on the surface of the titanium material, removing the fluoride layer formed on the surface of the titanium material just before rolling and then rolling the titanium material to give a rolled article.

In detail, in the process for manufacturing rolled articles of titanium material, prior to rolling the titanium material, the titanium material in a heated condition is contacted with a fluorine- or fluoride-containing gas by, for example, passing it through a fluorine- or fluoride-containing gas atmosphere. An oxide layer formed on the surface of the titanium material by its reaction with oxygen in the air is thereby removed with the fluorine- or fluoride-containing gas to clean the surface of the titanium material and simultaneously to form a fluoride layer on the cleaned surface. The fluoride layer is stable, so that re-formation of an oxide layer and adsorption of $O_2$ on the base material of the titanium material are prevented until the subsequent removal process. Then, the fluoride layer on the surface of the titanium material is decomposed and removed just before rolling to cause the base material of the titanium material to be exposed. When the titanium material is rolled, no oxide layer is left on its surface. The oxide layer is not formed during the rolling because of high rolling speed, so that cracking in the rolling process can be prevented.

Next, the present invention is described in detail.

Fluorine- or fluoride-containing gas to be used for the process in the present invention is an inert gas, such as $N_2$, containing at least one of the fluorine source components, such as $NF_3$, $BF_3$, $CF_4$, HF, $SF_6$, and $F_2$. $NF_3$ is most preferable and practical in respect of reactivity, easiness of handling and other properties.

As mentioned above, in the process for manufacturing a rolled articles of titanium material according to the present invention, heated titanium material is contacted with a fluorine- or fluoride-containing gas prior to rolling to conduct a surface treatment of the titanium material by, for example, passing the titanium material through a fluorine- or fluoride-containing gas atmosphere. Thereafter, $H_2$ gas or the like is sprayed on the titanium material just before rolling to remove a fluoride layer from its surface to expose base material thereof. The material is then rolled to obtain a rolled article. Concentration of the fluorine source components, such as $NF_3$ of the fluorine- or fluoride-containing gas is, for example, 1000 to 100000 ppm, preferably 20000 to 70000 ppm and most preferably 30000 to 50000 ppm. Time for passing through the fluorine- or fluoride-containing gas atmosphere may be selectively set corresponding to kinds, sizes and heating temperatures or the like and is generally a few minutes to scores of minutes.

An apparatus used in the process for manufacturing rolled articles of titanium material is further concretely described. As shown in figure, a gas treatment chamber 2 and upper and lower two nozzles 3 for spraying $H_2$ gas are disposed before a plurality of pairs of rolls 4. Thick plate-form titanium material 1 having high temperature taken out of a heating furnace (not shown) is passed through the gas treatment chamber 2 and between the nozzles 3, and is then rolled in rolls 4. Gas guide lines 5 and an exhaust line 6 are inserted into an outer shell 2a of the gas treatment chamber 2. Fluorine- or fluoride-containing gas, for example, mixed gas of $NF_3$ and $N_2$ is supplied to the gas guide lines 5 from a gas cylinder (not shown). The supplied fluorine- or fluoride-containing gas is agitated by a fan 7 driven by a motor 8 to form the inside of the treatment chamber 2 into a uniform fluorine- or fluoride-containing gas atmosphere. The inside temperature of the gas treatment chamber 2 is raised high by the titanium material 1 passed there through. An oxide film formed on the surface of the material 1 by reaction of titanium with oxygen in the air is removed from the surface of the titanium material while the titanium material is passed through the inside of the gas treatment chamber 2. That is, $NF_3$ gas generates active fluorine when having high temperature, whereby organic and inorganic contaminants on the surface of the titanium material are removed. The generated fluorine simultaneously reacts with oxide, such as titanium oxide on the surface of the material to form a quite thin fluoride layer on the titanium material surface.

The reaction changes the oxide layer on the surface of the titanium material to the fluoride layer and removes $O_2$ adsorbed on the titanium material surface. The fluoride layer is stable when there exists no $O_2$, $H_2$, nor $H_2O$ and it prevents formation of oxide layer and adsorption of $O_2$ on the base material of the titanium material until the subsequent $H_2$ gas spraying process. Also, in such a fluorinating process, the fluoride layer is formed on the inside wall surface of the outer shell 2a at the initial stage to avoid a further possible damage to the inside wall surface of the outer shell 2a due to application of $NF_3$ gas thereafter with the fluoride layer.

$H_2$ gas is sprayed through the nozzles 3 to the titanium material 1 thus treated by $NF_3$ gas. Because of this, the aforementioned fluoride layer is reduced or broken with $H_2$ gas, for example, as represented in the following formula to thereby obtain active titanium base material.

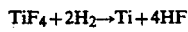

The titanium material 1 in this state is rolled by the rolls 4. Since the rolling speed then is high, an oxide film is not formed on the titanium material surface again during passing through the rolls 4. In case that titanium material 1 is required to be rolled more than ten times through the rolls 4, nitrogen gas may be sprayed on the material 1 at a later stage of rolling step. Reference numeral 9 in the drawing denotes a hood.

As mentioned above, in the process for manufacturing rolled articles of titanium material according to the present invention, titanium material is passed through the fluorine- or fluoride-containing gas atmosphere prior to rolling. A passive coat layer, such as an oxide layer, on the titanium material surface is changed to the fluoride layer which protects the surface of the titanium material. Therefore, even when there is space of time between formation of a fluoride layer on the surface of thereof and fluoride removal process, the fluoride layer protects and keeps the surface of the titanium material in a favorable condition, which results in that re-formation of an oxide layer on the material surface is prevented. Since the fluoride layer is decomposed and removed just before rolling to expose the base titanium material, it is realized to exclude crack in rolling the titanium material.

DETAILED DESCRIPTION OF THE PREFERRED EMBODIMENTS

Figure 1:
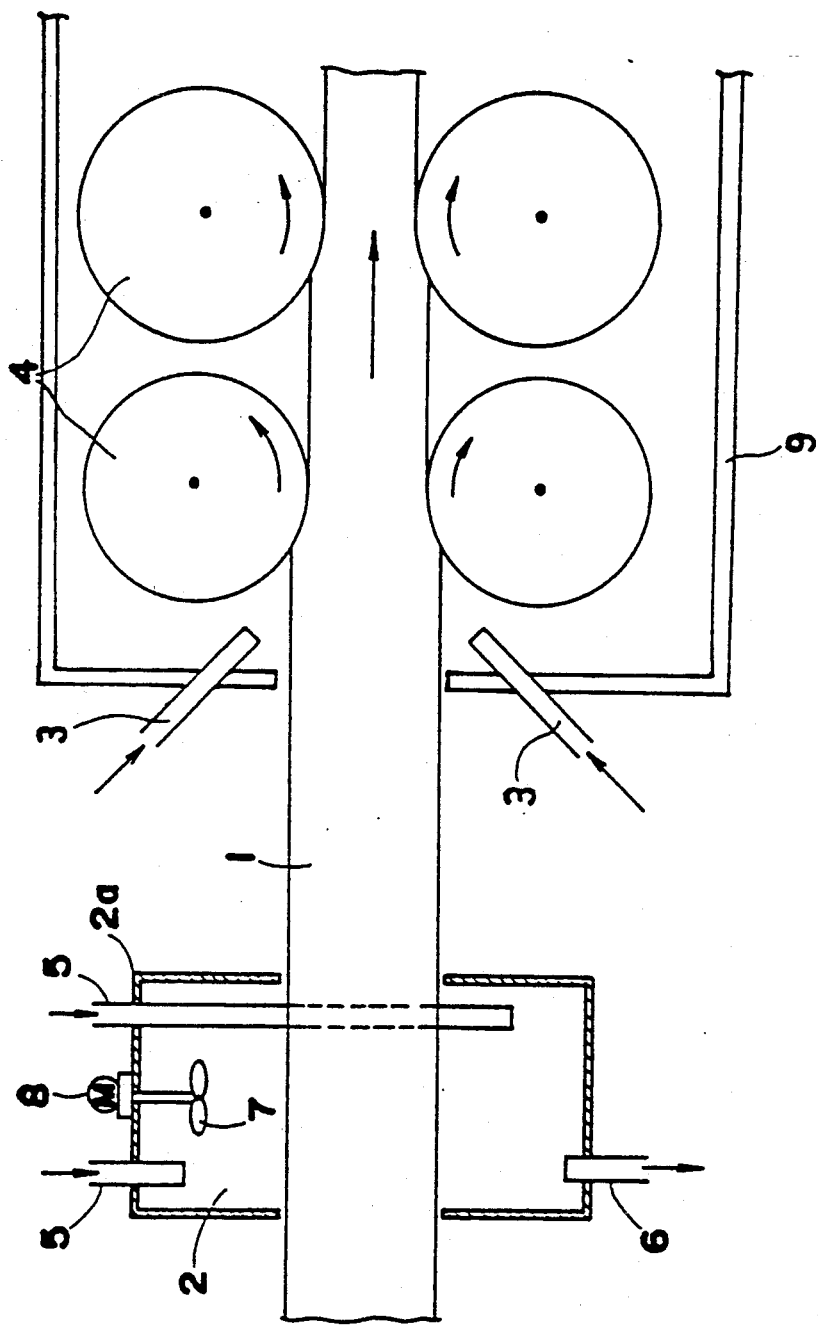
FIG. 1 is an explanatory view showing an apparatus used in an example of the present invention.

Next, the present invention is described based on an example.

Example

Titanium in a thick plate-like form and red heated in the heating furnace was passed through a gas treatment chamber of $N_2$ gas atmosphere containing 5000 ppm of $NF_3$, and then was sprayed uniformly with $H_2$ gas from nozzles just before rolling and rolled by rolls to give a thin plate-form titanium. The obtained thin plate titanium did not include any cracks.

What is claimed is:

1. A process for manufacturing rolled articles of titanium material comprising steps of contacting titanium material in a heated condition with fluorine- or fluoride-containing gas to form a fluoride layer on the surface of the titanium material, removing the fluoride layer formed thereon just before rolling and then rolling the titanium material to give a rolled article.

* * * * *